(12) United States Patent　　　　(10) Patent No.: US 12,636,682 B1

Hong　　　　　　　　　　　　　　　(45) Date of Patent: May 26, 2026

---

(54) CLEANING DEVICE

(71) Applicant: DaVinci II CSJ, LLC, Fairfield, NJ (US)

(72) Inventor: Qian Hong, Ningbo (CN)

(73) Assignee: DaVinci II CSJ, LLC, Fairfield, NJ (US)

( * ) Notice: Subject to any disclaimer, the term of this patent is extended or adjusted under 35 U.S.C. 154(b) by 0 days.

(21) Appl. No.: 19/259,225

(22) Filed: Jul. 3, 2025

(30) Foreign Application Priority Data

Jan. 7, 2025　(CN) .......................... 202520033738.1

(51) Int. Cl.
　　B08B 1/34　　　　　(2024.01)
　　A47J 37/07　　　　　(2006.01)
　　F21V 33/00　　　　　(2006.01)

(52) U.S. Cl.
　　CPC ............. B08B 1/34 (2024.01); A47J 37/0786 (2013.01); F21V 33/0084 (2013.01)

(58) Field of Classification Search
　　CPC ..... B08B 1/34; A47J 37/0786; F21V 33/0084
　　USPC .............................................................. 15/3
　　See application file for complete search history.

(56) References Cited

U.S. PATENT DOCUMENTS

| | | | | | |
|---|---|---|---|---|---|
| 5,890,249 | A | * | 4/1999 | Hoffman | A47L 11/4069 |
| | | | | | 15/97.1 |
| 5,947,806 | A | * | 9/1999 | Rhoads | B24B 23/02 |
| | | | | | 451/178 |

| | | | | | |
|---|---|---|---|---|---|
| 6,817,932 | B2 | * | 11/2004 | Furey | B08B 1/36 |
| | | | | | 15/160 |
| D601,347 | S | * | 10/2009 | Wales | D4/122 |
| 8,201,297 | B2 | * | 6/2012 | Fulmer | A46B 15/0034 |
| | | | | | 15/82 |
| 8,209,812 | B1 | * | 7/2012 | Dondurur | A46B 9/005 |
| | | | | | 15/160 |
| 9,596,927 | B1 | * | 3/2017 | Dasilva | A46B 13/001 |
| 9,903,133 | B2 | * | 2/2018 | Bruneel | C02F 1/00 |
| 11,234,558 | B2 | * | 2/2022 | Norris | A47L 13/06 |
| D959,778 | S | * | 8/2022 | Prior | D32/46 |
| D993,562 | S | * | 7/2023 | Prior | D32/46 |
| 11,759,053 | B2 | * | 9/2023 | Norris | A47L 17/00 |
| | | | | | 134/6 |
| D1,021,312 | S | * | 4/2024 | Youngblood | D32/46 |

(Continued)

FOREIGN PATENT DOCUMENTS

| | | | | | |
|---|---|---|---|---|---|
| CN | 113951798 | A | * | 1/2022 | ........... A47L 25/005 |
| CN | 113974500 | A | * | 1/2022 | ........... A47L 11/4013 |

(Continued)

*Primary Examiner* — Marc Carlson

(74) *Attorney, Agent, or Firm* — Kelley Drye & Warren LLP

(57) ABSTRACT

A cleaning device including: a body; a motor housed within the body; a roller body operatively connected to the motor and configured to rotate during operation, wherein the roller body includes: a flexible core extending along a central axis; a plurality of circumferentially spaced primary ribs projecting radially outward from the flexible core to a first radial height; a plurality of circumferentially spaced secondary ribs interleaved with the primary ribs and projecting radially outward from the flexible core to a second radial height less than the first radial height; and a chainmail scrubbing layer disposed over the flexible core and conforming to an outer surface defined by the primary ribs and secondary ribs.

20 Claims, 13 Drawing Sheets

(56) References Cited

U.S. PATENT DOCUMENTS

| | | | | |
|---|---|---|---|---|
| D1,024,474 S | * | 4/2024 | Cheng | D32/46 |
| 12,004,682 B1 | * | 6/2024 | de Geus | A47J 36/025 |
| 2012/0028554 A1 | * | 2/2012 | Weinberger | A46B 15/0081 |
| | | | | 15/236.01 |
| 2012/0138105 A1 | * | 6/2012 | Masia Perales | B08B 1/12 |
| | | | | 134/99.2 |
| 2016/0325317 A1 | * | 11/2016 | Gordon | A47L 17/00 |
| 2018/0263455 A1 | * | 9/2018 | Weinberger | B25G 3/14 |
| 2019/0053668 A1 | * | 2/2019 | Norris | B08B 1/165 |
| 2019/0069667 A1 | * | 3/2019 | Prior | A46B 9/005 |
| 2021/0186203 A1 | * | 6/2021 | Webb | A46B 5/02 |
| 2023/0380628 A1 | * | 11/2023 | Bertorelli | A46B 5/0033 |
| 2023/0389687 A1 | * | 12/2023 | Shewan | A47J 37/0786 |

FOREIGN PATENT DOCUMENTS

| | | | | | |
|---|---|---|---|---|---|
| CN | 118177649 A | * | 6/2024 | | A47L 7/00 |
| KR | 20100004045 U | * | 4/2010 | | B08B 1/34 |
| WO | WO-2022155366 A1 | * | 7/2022 | | A47L 17/08 |
| WO | WO-2023001310 A1 | * | 1/2023 | | A47L 11/30 |

* cited by examiner

114

152

102

CLEANING DEVICE

CROSS-REFERENCE TO RELATED APPLICATION

This application claims the benefit of Chinese Application No. 2025200337381, filed on Jan. 7, 2025.

TECHNICAL FIELD

The present invention relates generally to cleaning devices, and more particularly to a motorized cleaning apparatus for use with grills, barbeques, smokers, griddles, and similar cooking surfaces.

BACKGROUND

Reference may be made herein to other United States patents, foreign patents, and/or other technical references. Any reference made herein to other documents is an express incorporation by reference of the document so referenced in its entirety.

Outdoor cooking appliances such as grills, barbeques, smokers, and griddles are prone to accumulating stubborn debris, carbon buildup, and grease following use. Regular cleaning of these surfaces is critical not only for hygiene and safety but also to maintain optimal cooking performance and prolong the life of the appliance.

Traditionally, cleaning of such surfaces has been performed manually using implements such as steel wire brushes or bristle-equipped scrubbers. While widely used, these conventional cleaning tools suffer from several drawbacks. Over time, steel wires and bristles can become brittle, frayed, or detached, potentially leaving behind small metal fragments on the cooking surface. These loose metal pieces pose a serious ingestion hazard if they go unnoticed during subsequent cooking.

Moreover, traditional wire brushes are often rigid and lack the flexibility necessary to clean effectively around the curved or irregular geometry of grill grates and other non-flat surfaces. The stiff structure makes it difficult to reach into the narrow gaps between grates or to follow the contours of rounded surfaces, reducing the thoroughness of cleaning. Additionally, the abrasive action provided by steel bristles is often insufficient to remove heavily carbonized residue without the application of excessive force, which can damage coated or more delicate surfaces.

Some modern cleaning devices have attempted to incorporate powered mechanisms or alternative materials, but these often still rely on abrasive pads, rotating brushes, or other configurations that do not adequately address the fundamental limitations of rigidity, ineffective contact with uneven surfaces, and the potential shedding of hazardous cleaning materials.

There exists a need for a durable, effective, and safe grill-cleaning device that can provide robust scrubbing action while conforming to the intricate geometries of grill grates and similar surfaces, without the safety risks and performance limitations inherent in conventional tools.

In current practice, a barbecue grill is not only a cooking tool, but also a cultural symbol and plays an indispensable role in outdoor gatherings and family entertainment. However, as the popularity and frequency of barbecue use has increased, the need for effective cleaning of barbecue grills has become more significant. The accumulation of grease and food residue not only affects the effectiveness of grilling but can also pose health risks. Therefore, the cleanliness of the barbecue becomes crucial.

The existing barbecue cleaning brushes described above exhibit significant shortcomings in functional design, making it difficult to satisfy users' varied needs for thorough and effective grill cleaning. In particular, the cleaning surface of conventional brushes is typically flat and relies on a horizontal pushing motion. While this provides a relatively large contact area, it also results in high friction, limited maneuverability, and labor-intensive operation. A notable issue is that stainless-steel mesh surfaces are especially prone to wear from prolonged high-friction contact, which shortens the lifespan of the brush and diminishes cleaning performance. Additionally, these brushes often perform poorly on uneven or complex grill surfaces, as well as in hard-to-reach areas. Due to the inability of the brush head to flexibly adapt to varying shapes and angles, residue and debris are often left behind, compromising both the cleanliness of the grill and its subsequent use.

SUMMARY

Techniques described herein are directed to a motorized cleaning device for grills and similar cooking surfaces. The device includes a cylindrical chainmail scrubber mounted on a flexible, ribbed rubber core, allowing for effective cleaning of metal surfaces, including hard-to-reach areas between grill grates.

An example embodiment of the present disclosure may be a cleaning device including: a body; a motor housed within the body; a roller body operatively connected to the motor and configured to rotate during operation, wherein the roller body includes: a flexible core extending along a central axis; a plurality of circumferentially spaced primary ribs projecting radially outward from the flexible core to a first radial height; a plurality of circumferentially spaced secondary ribs interleaved with the primary ribs and projecting radially outward from the flexible core to a second radial height less than the first radial height; and a chainmail scrubbing layer disposed over the flexible core and conforming to an outer surface defined by the primary ribs and secondary ribs.

In one embodiment, the primary ribs and secondary ribs are integrally formed with the flexible core.

In one embodiment, the flexible core includes a thermoplastic elastomer or silicone rubber.

In one embodiment, the chainmail scrubbing layer includes interlinked stainless steel rings.

In one embodiment, the primary ribs and secondary ribs alternate around the circumference of the flexible core.

In one embodiment, the flexible core includes a repeating pattern of alternating primary ribs and secondary ribs along an axial length of the roller body.

In one embodiment, the roller body is removably mounted within the body.

In one embodiment, the device includes an access panel configured to open to allow removal of the roller body from the body.

In one embodiment, the access panel is pivotally attached to the body by a hinge.

In one embodiment, the access panel includes a locking channel configured to engage with a locking interface on the body.

In one embodiment, the roller body includes an axle having a conical tip configured to align the roller body with a corresponding axle mount during installation.

In one embodiment, the device includes a handle connected to the body, the handle including a rechargeable battery configured to power the motor.

In one embodiment, the handle includes a charging port covered by a charging cover.

In one embodiment, the device includes a light mounted on the body and configured to emit light in a direction adjacent to the roller body.

In one embodiment, the device includes a light control button configured to activate or deactivate the light.

In one embodiment, the device includes a debris shield positioned rearward of the roller body and configured to deflect material expelled during cleaning.

In one embodiment, the chainmail scrubbing layer conforms to a contour defined by a radial difference between the primary ribs and the secondary ribs.

In one embodiment, the motor is a brushless DC motor.

In one embodiment, the roller body is configured to clean both planar and contoured surfaces.

In one embodiment, the body includes a coupling section configured to join the body to the handle and to route electrical power between the rechargeable battery and the motor.

The present disclosure addresses the technical problem of providing a roller-type barbecue grill cleaning brush that offers improved ease of use, reduced operational effort, and enhanced cleaning performance.

To solve this problem, the present disclosure provides a roller-type cleaning brush comprising a roller-type brush body, a brush head, and a brush handle. The brush head is located at the front end of the brush handle and includes a mounting slot at its front portion. The roller-type brush body is rotatably mounted within the mounting slot, with its lower surface extending below the bottom surface of the brush head to make contact with the surface to be cleaned.

The roller-type brush body comprises an elastic support body surrounded by a metal mesh sheath. The elastic support body includes a plurality of alternating protruding areas and depression areas. The protruding areas support the metal mesh sheath, while the depression areas facilitate the discharge of wastewater and removal of debris.

In one embodiment, the elastic support body includes annular ridges and annular depressions arranged along the axial direction to define the protruding and recessed areas. The width of each annular ridge may increase radially inward to form a ridged profile.

In another embodiment, the brush head includes a motor configured to drive the roller-type brush body in rotation.

The mounting slot may be provided with a deflector positioned on the rear side of the roller-type brush body.

The front surface of the brush head may be inclined forward from top to bottom, and the inclined surface above the mounting slot may include a lighting element.

The metal mesh sheath may be wrapped around the entire length of the elastic support body, with both ends of the sheath secured.

The front end of the deflector may curl downward and backward to form a curled edge structure.

In another embodiment, the roller-type cleaning brush comprises a roller-type brush body, a brush head, and a brush handle.

Compared with known techniques, the present disclosure provides several advantages. The elastic support body offers both structural support and elasticity, allowing the metal mesh sheath to be uniformly distributed and closely conformed to the surface being cleaned. The protruding regions of the elastic support body serve as a structural base for the mesh sheath, helping maintain a uniform cleaning surface and consistent cleaning pressure. The recessed regions facilitate the discharge of wastewater and the collection of debris, thereby preventing clogging and sustaining cleaning performance over extended use. This alternating protrusion-and-recess structure also increases the active surface area and enhances friction at the cleaning interface, improving the overall cleaning effect. The rotatable mounting of the brush body enables flexible adjustment to various surface shapes and angles, increasing cleaning adaptability and coverage. Furthermore, rotation reduces resistance during operation, contributing to smoother and more efficient cleaning.

The above summary has outlined, rather broadly, some features and technical advantages of the present disclosure so that the detailed description that follows may be better understood. Additional features and advantages of this disclosure will be described below. It should be appreciated by those skilled in the art that this disclosure may be readily utilized as a basis for modifying or designing other systems and structures for carrying out the same or similar purposes of the present disclosure. It should also be realized by those skilled in the art that such equivalent systems and structures do not depart from the teachings of the disclosure as set forth in the appended claims. The novel features, which are believed to be characteristic of this disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings, in which.

DETAILED DESCRIPTION

Figure 1:
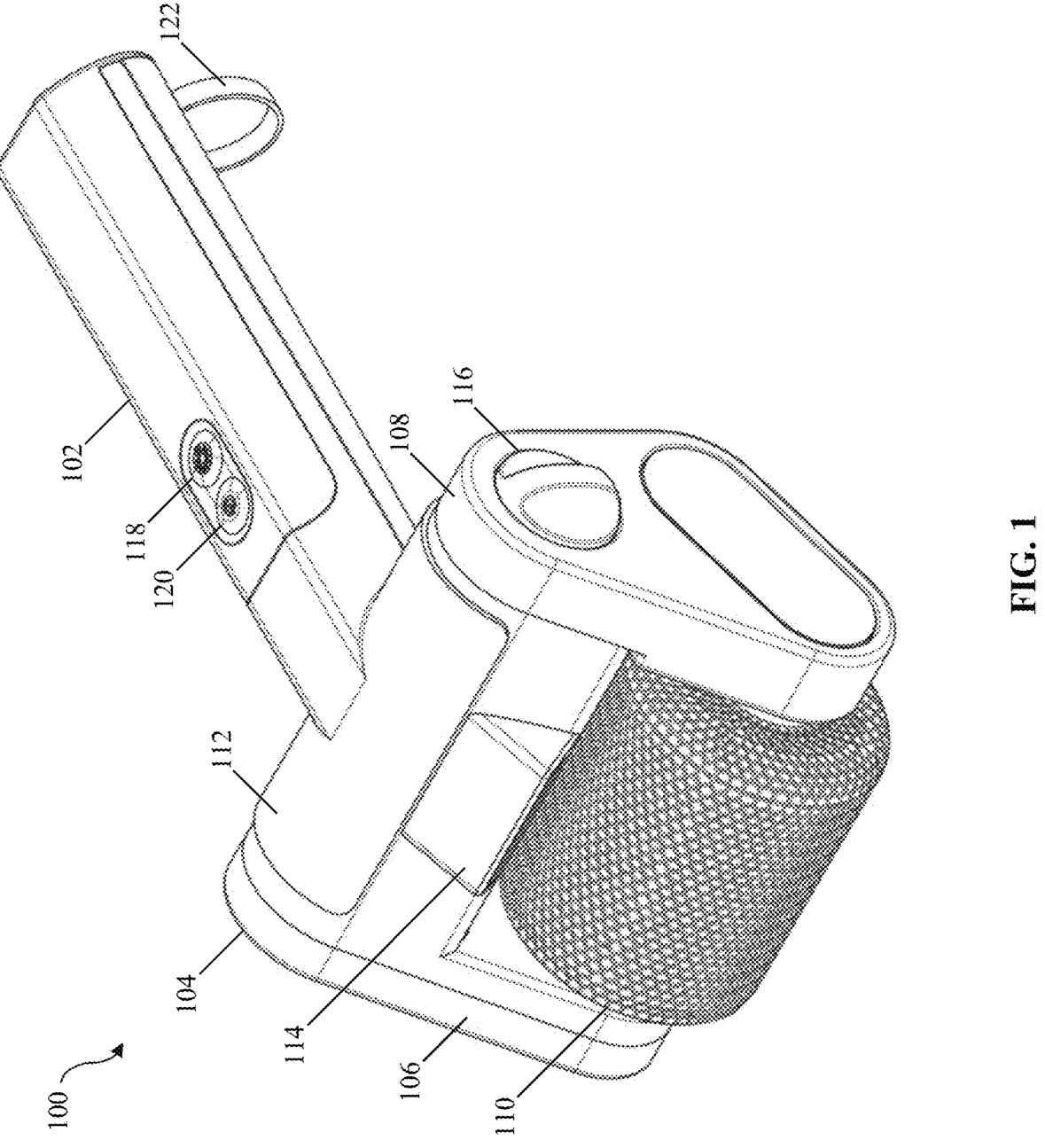
FIG. 1 depicts a perspective view of a motorized chainmail cleaning device according to an embodiment of the present disclosure.
Figure 2:
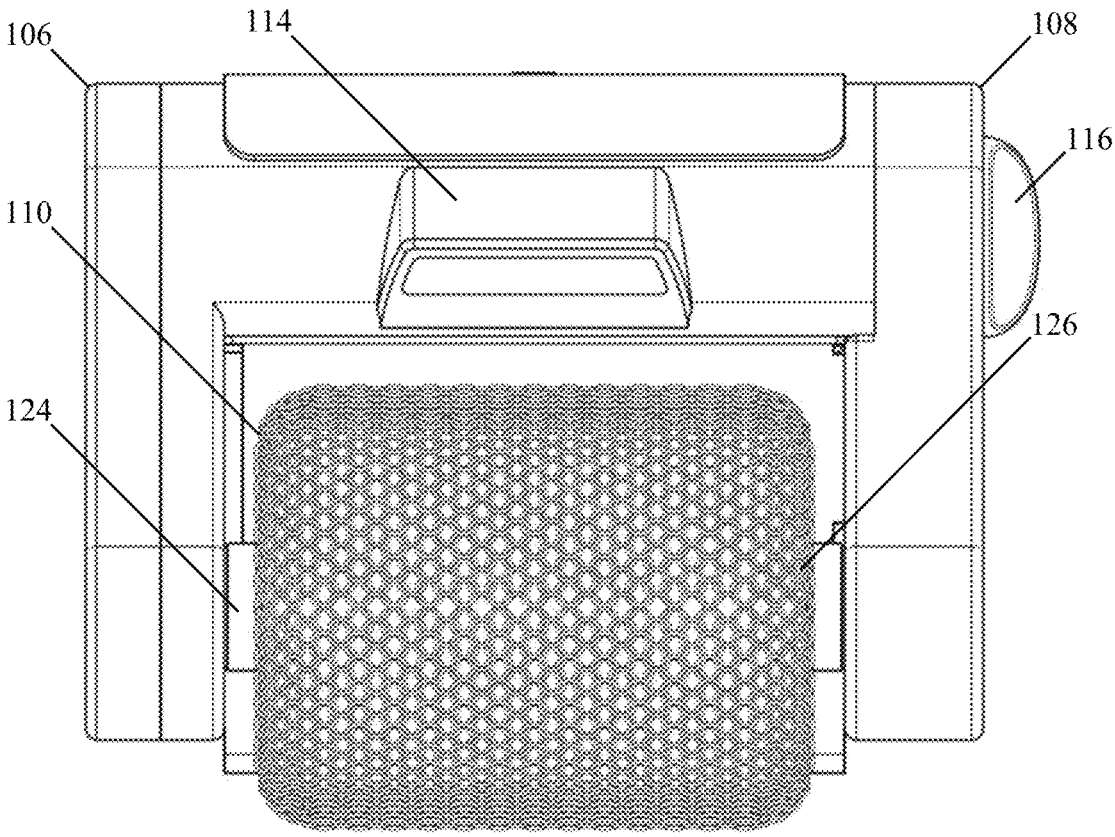
FIG. 2 depicts a front view of the cleaning device according to an embodiment of the present disclosure.
Figure 3:
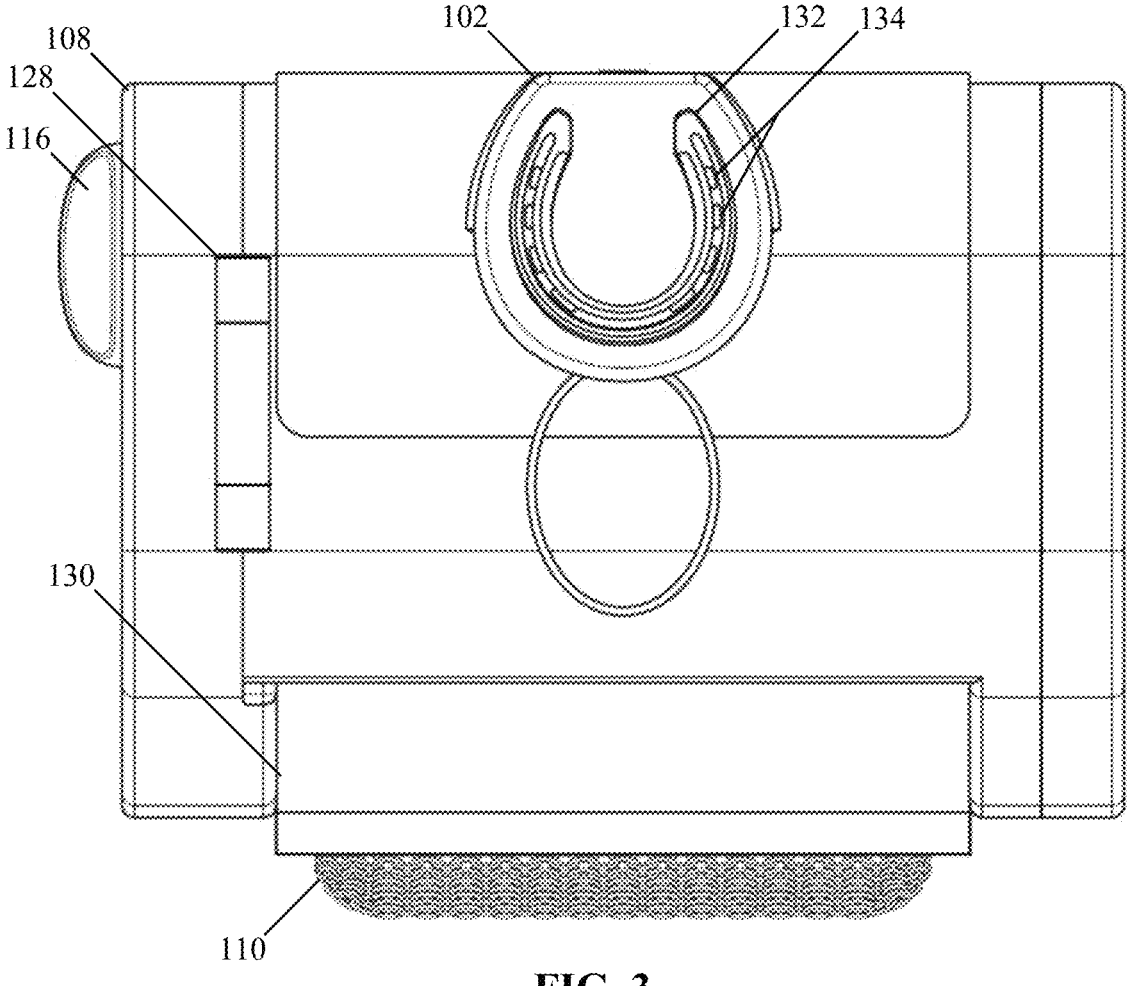
FIG. 3 depicts a rear view of the cleaning device according to an embodiment of the present disclosure.
Figure 4:
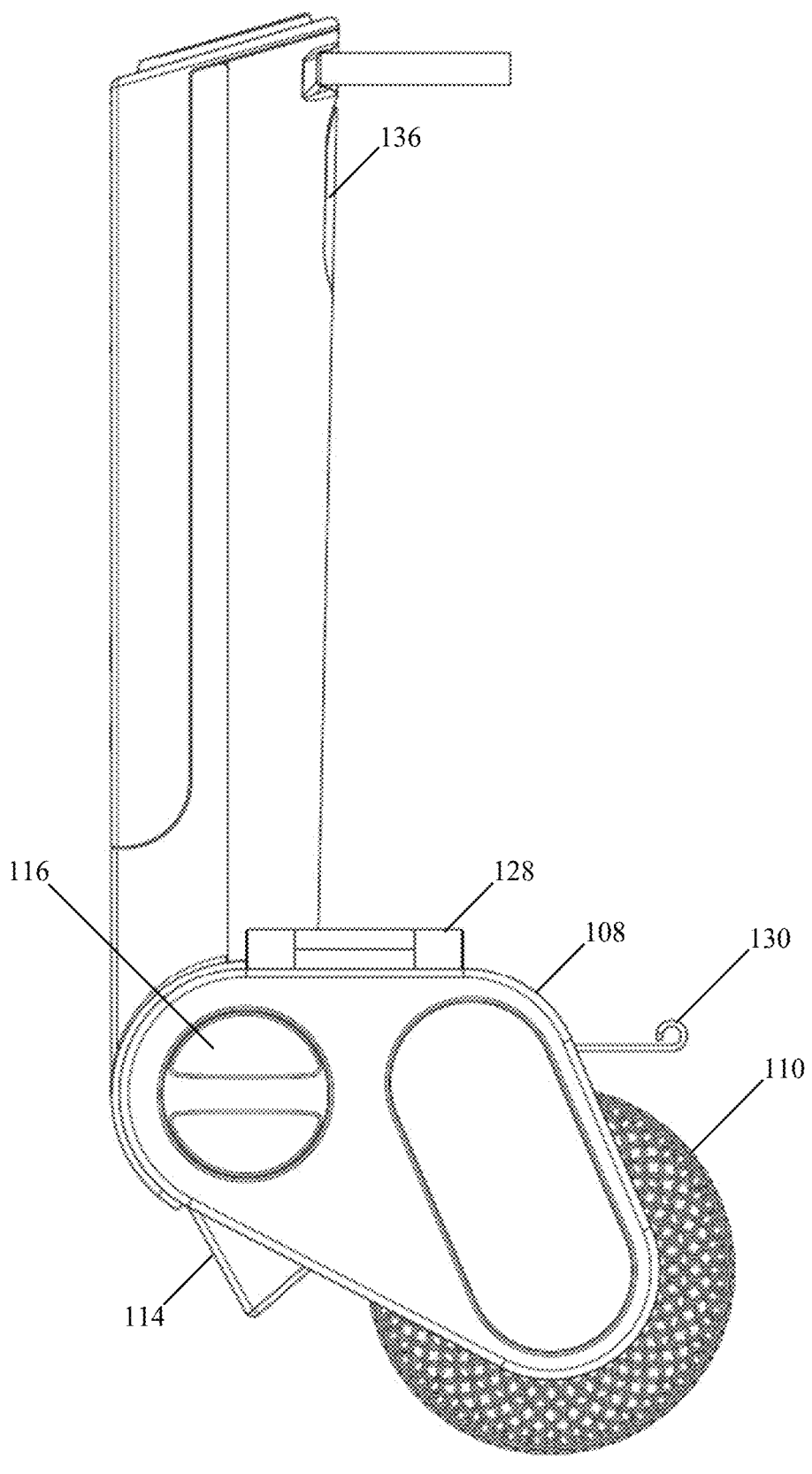
FIG. 4 depicts a left side view of the cleaning device according to an embodiment of the present disclosure.
Figure 5:
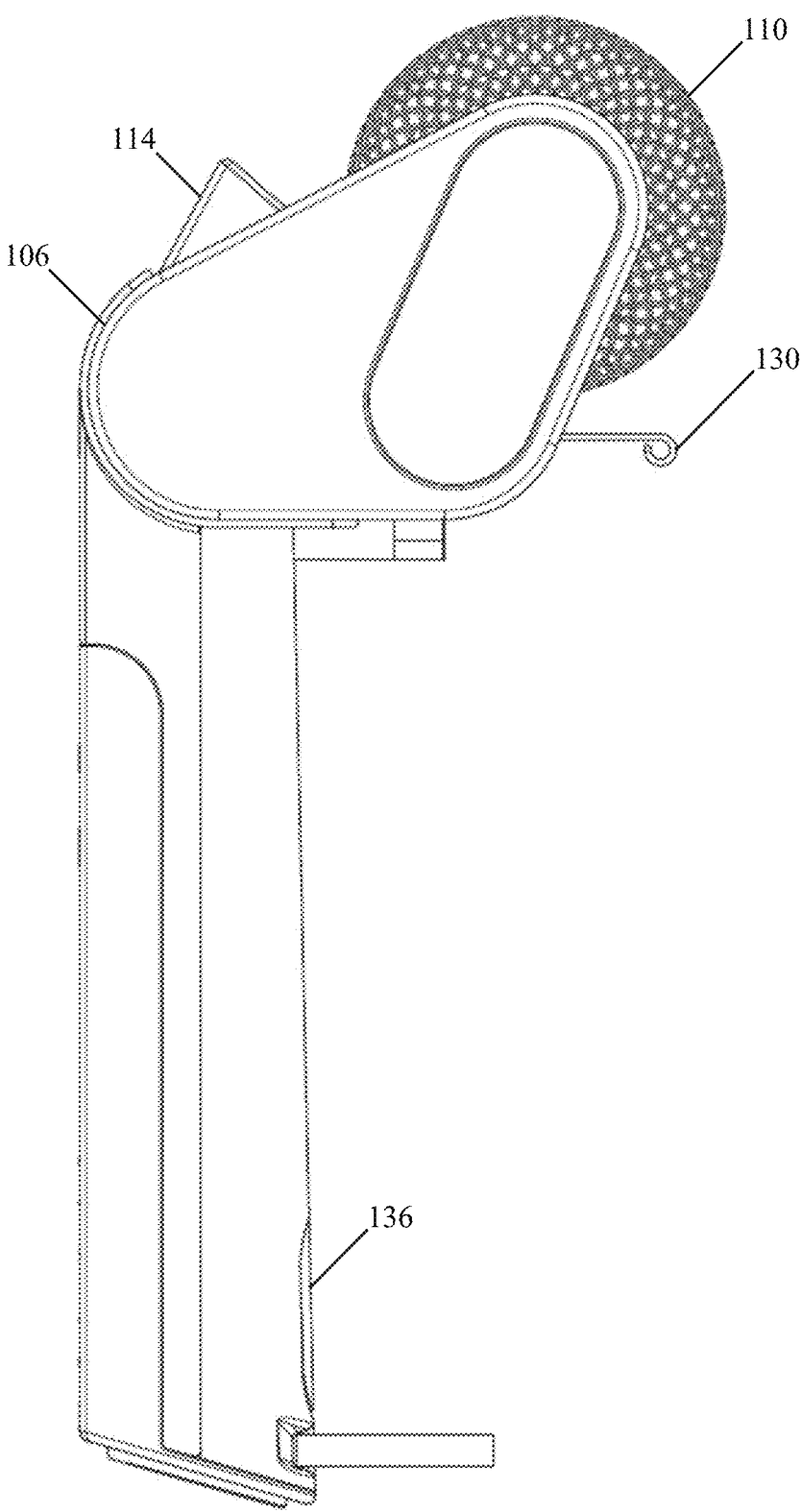
FIG. 5 depicts a right side view of the cleaning device according to an embodiment of the present disclosure.
Figure 6:
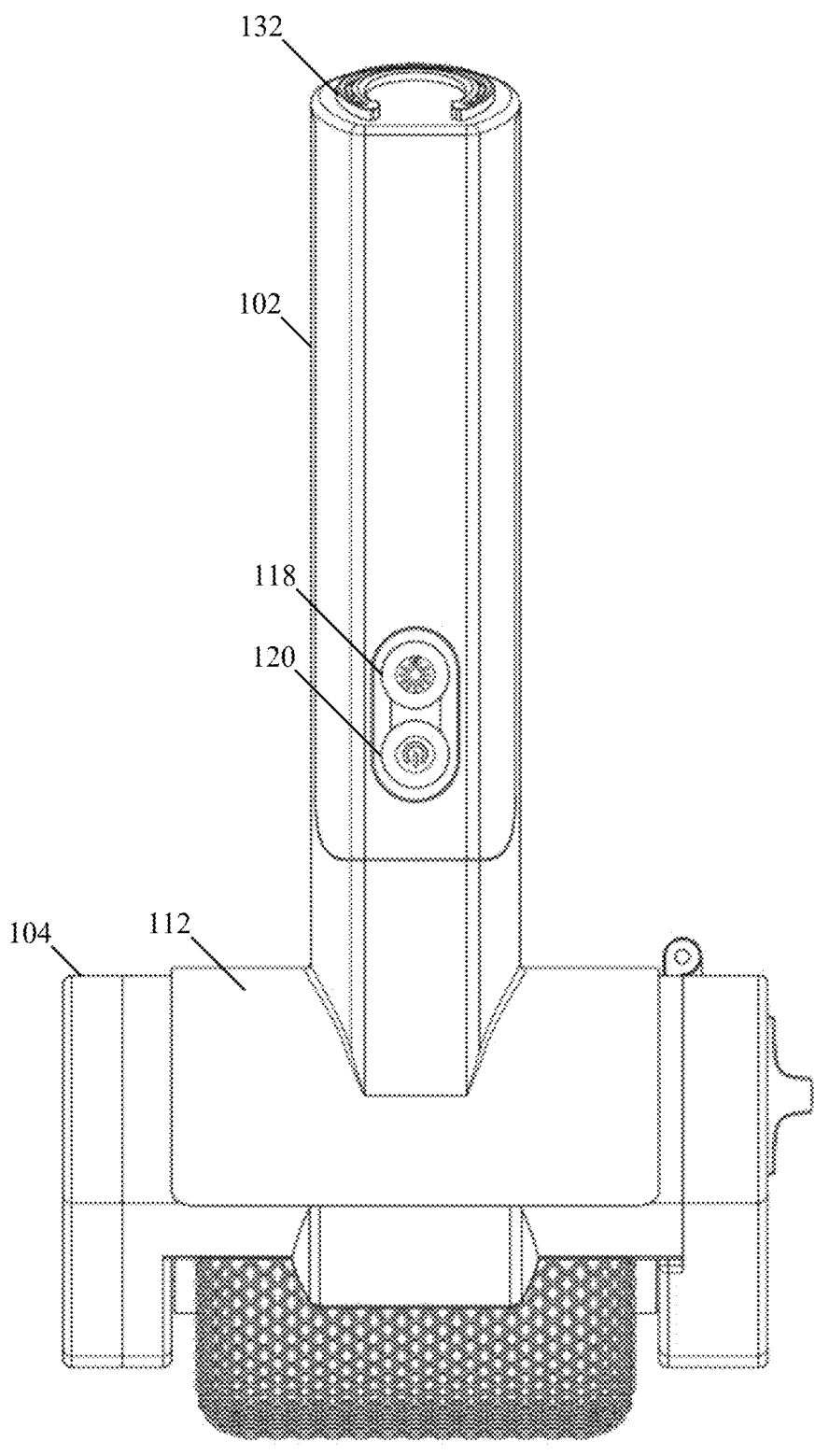
FIG. 6 depicts a top view of the cleaning device according to an embodiment of the present disclosure.
Figure 7:
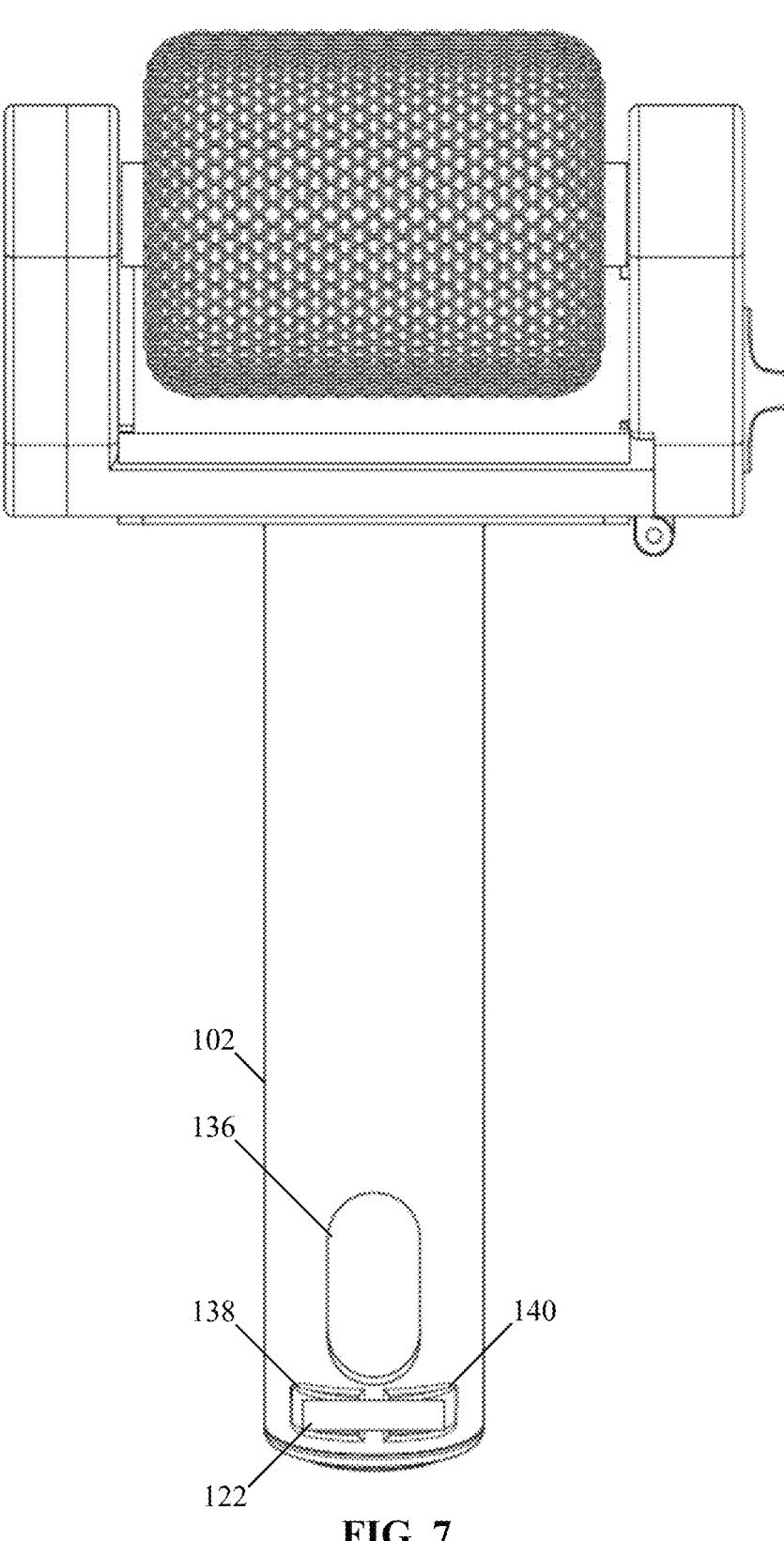
FIG. 7 depicts a bottom view of the cleaning device according to an embodiment of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts disclosed herein. It will be apparent, however, to those skilled in the art that these concepts may be practiced without these specific details. In some instances, well-known features may be omitted or simplified in order to not obscure the embodiment being described.

Referring to FIGS. 1 through 7, cleaning device 100 may include handle 102, body 104, and roller body 110, which may be supported for rotation relative to body 104. Coupling section 112 may connect handle 102 to body 104 and may form either a continuous housing or a mechanically reinforced interface depending on application-specific requirements. Handle 102 may contain a rechargeable battery electrically coupled to a motor located within body 104. Charging cover 136 may enclose a port configured to receive external power for recharging and may include a seal or other protective feature to reduce exposure to contaminants.

Roller body 110 may include a flexible core formed from an elastomeric material such as silicone or thermoplastic rubber. The core may include longitudinal ribbing configured to enhance torsional stiffness while allowing localized deformation under load. Chainmail 126 may surround roller body 110 and may include interlinked stainless steel rings configured to form a flexible abrasive layer.

Chainmail 126 may be configured to conform to variable geometries of cooking surfaces. When roller body 110 is rotated against a surface, chainmail 126 may locally deform to match contours such as grooves between grill grates or planar areas on a griddle. Ribbed sections of roller body 110 may compress in response to contact pressure, allowing chainmail 126 to maintain contact with both recessed and elevated regions of the cleaning surface. Ring tension and alignment may be maintained through compression between roller body 110 and the surface being cleaned. This behavior may enhance cleaning efficiency while reducing required user effort.

Alternative embodiments of chainmail 126 may include modified link geometries such as flat-profile rings, or may incorporate materials including ceramics, polymeric elements, or grit-coated surfaces to tailor abrasiveness. Construction methods for chainmail 126 may include butted, welded, or riveted connections depending on strength, weight, and flexibility requirements. Chainmail parameters such as ring size, link density, and material thickness may be selected to address specific surface conditions or application preferences.

Roller body 110 may be removably mounted within body 104 to enable cleaning or replacement. Access panel 108, which may be hinged at access panel hinge 128 and secured by access panel lock knob 116, may be configured to open and permit removal of roller body 110. Roller body axle 124 may support roller body 110 and may include keyed or slotted surfaces configured to engage with a drive mechanism housed within body 104, enabling torque transmission during operation and rotational alignment during reinstallation.

The motor housed within body 104 may be configured to rotate roller body 110 about roller body axle 124. Power to the motor may be controlled through power control button 120. Power indicator 132 and power LEDs 134 may provide visual feedback related to charge level, operational status, or error conditions. Light 114, which may be mounted near a forward region of body 104, may be configured to illuminate the cleaning area and may be selectively activated or deactivated by light control button 118.

Debris shield 130 may be positioned rearward of roller body 110 and may be configured to deflect expelled debris, grease, or fluid away from the user during operation. Debris shield 130 may be formed from metal or polymeric material and may follow the contour of roller body 110 to increase effectiveness while maintaining durability.

Side panel 106 may enclose lateral portions of body 104. Strap openings 138 and 140 may be formed near the rear of handle 102 and may be configured to receive handle strap 122 for transport, storage, or operational convenience. Coupling section 112 may include internal routing paths for electrical wiring, structural features for load transfer, or vibration isolation between handle 102 and body 104.

Figure 8:
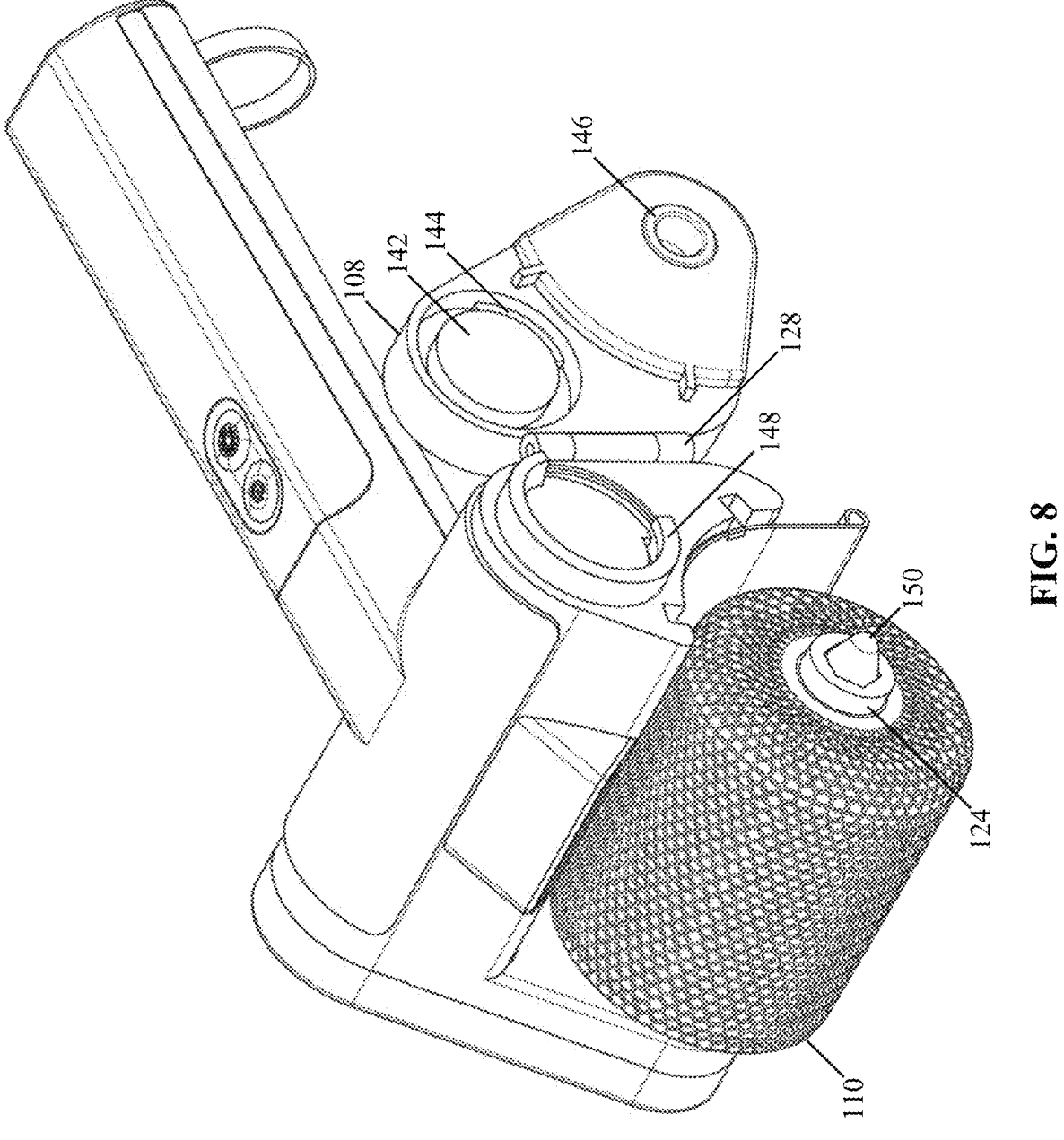
FIG. 8 depicts the cleaning device with an open access panel, according to an embodiment of the present disclosure.

Referring to FIG. 8, cleaning device 100 may include access panel 108 configured to open by rotation about access panel hinge 128. Opening access panel 108 may expose roller body 110 and roller body axle 124, enabling removal of roller body 110 from the cleaning device. Roller body 110 may be removed for purposes including surface cleaning, mechanical inspection, or replacement with a compatible roller body.

Roller body axle 124 may support roller body 110 during operation and may include conical tip 150 located at a terminal end of the axle. Conical tip 150 may be configured to guide roller body axle 124 into axial alignment during reinstallation and may facilitate smooth engagement with axle mount 146 located within body 104. Axle mount 146 may serve as a structural receiver and rotational support for roller body axle 124.

Locking knob body 142 may house locking interface 144, which may engage with locking channel 148 located along the edge of access panel 108. When access panel 108 is closed, locking channel 148 may be received within locking interface 144 and may secure access panel 108 in a closed configuration. This locking mechanism may stabilize the position of roller body 110 within body 104 during operation and may also prevent unintended disengagement of roller body axle 124.

Roller body 110 may be cleaned separately from the rest of the device by removing it through the open access panel. Removal may allow for rinsing, soaking, degreasing, or mechanical agitation of the chainmail surface in isolation from any electrical components or motor hardware. In some embodiments, multiple roller bodies may be prepared for different cleaning tasks, and may be interchanged depending on the application or surface condition.

Access panel hinge 128 may allow access panel 108 to rotate between open and closed positions, and may be integrally formed with body 104.

Figure 9:
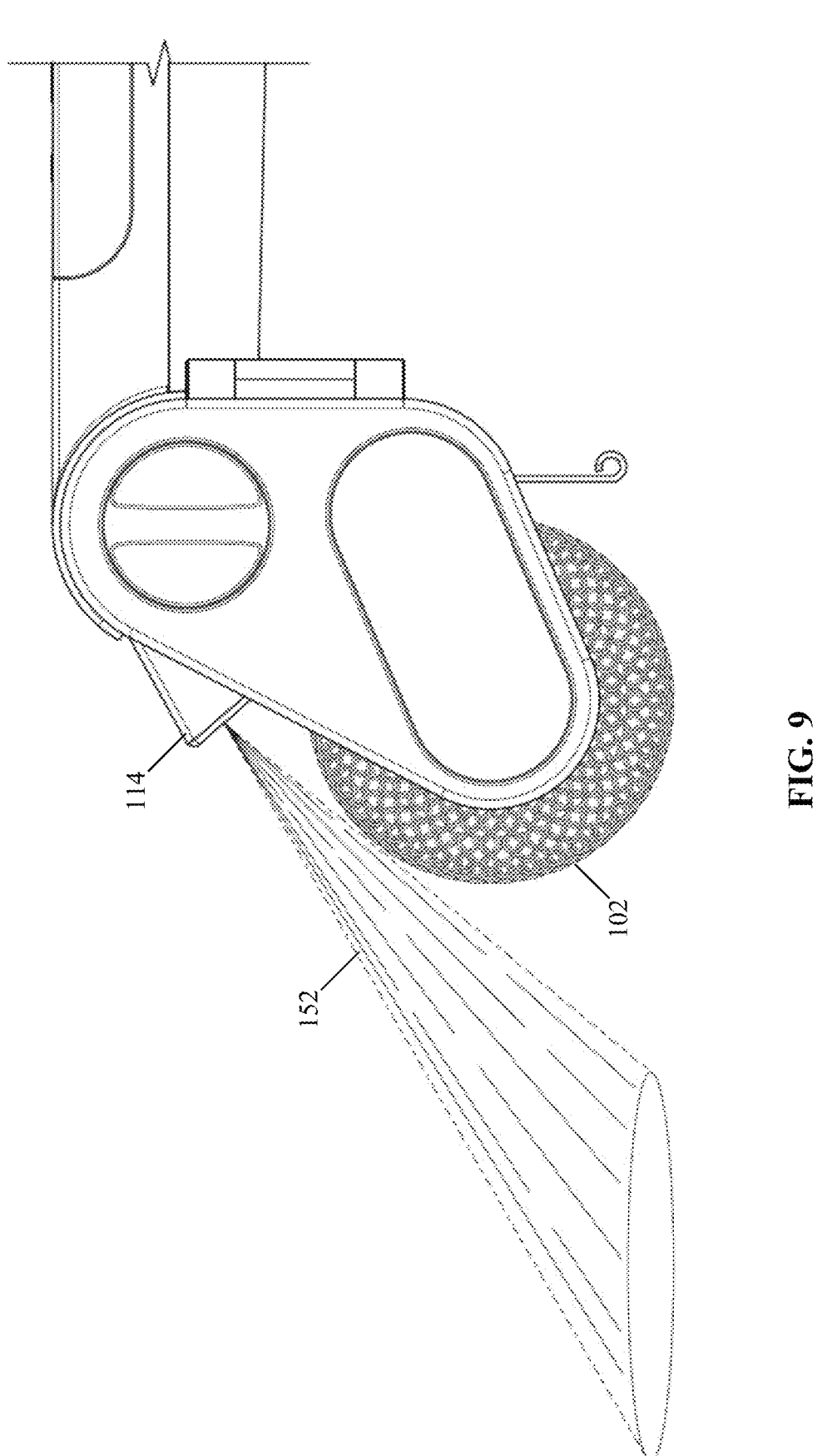
FIG. 9 depicts the cleaning device with an integrated light in an activated state, according to an embodiment of the present disclosure.

Referring to FIG. 9, light 114 may be mounted on a forward region of body 104 and may be configured to emit light 152 toward a working surface adjacent to roller body 110. Light 114 may be oriented such that light 152 is directed downward and forward, providing illumination of the area proximate to the contact region of roller body 110, including grill grates, griddles, or other surfaces configured to be cleaned.

Light 114 may be selectively activated by light control button 118 and may operate independently from the power control system governing motor output. In certain embodiments, light 114 may comprise a single white LED, or a compact LED cluster, powered by the internal battery located within handle 102. Light 114 may be shielded by an optically clear or diffused protective lens and may be embedded within body 104 to protect against ingress from grease, water, or debris generated during use.

The shape and angle of light 152 may be configured to minimize operational shadowing and may allow users to visually confirm surface cleanliness in low-light conditions or confined environments. Positioning of light 114 may be selected to optimize visibility in front of or beneath roller body 110 without interfering with device operation or ergonomics.

Figure 10:
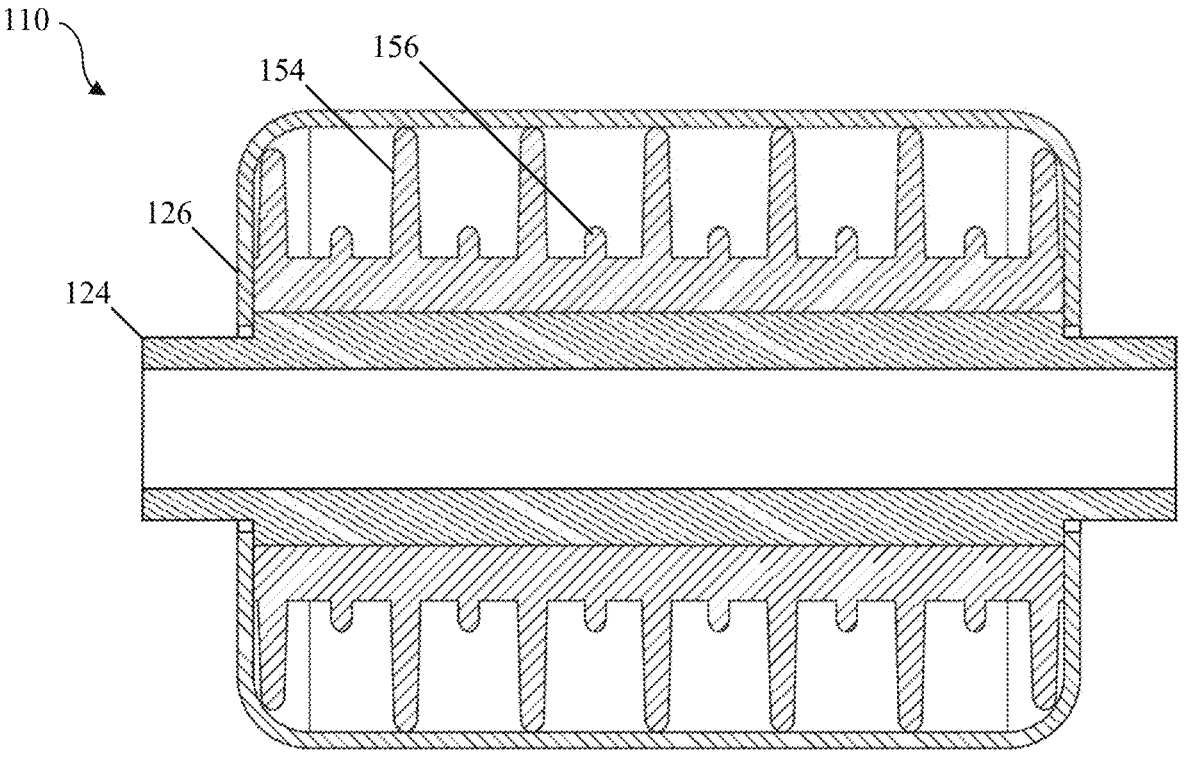
FIG. 10 depicts a detailed view of the roller body component of the cleaning device, according to an embodiment of the present disclosure.

Referring to FIG. 10, roller body 110 may include roller body axle 124, chainmail 126, and a flexible core structure configured to enhance surface conformity during cleaning. The flexible core may be over molded or otherwise formed around roller body axle 124 and may serve as a support substrate for chainmail 126.

The core of roller body 110 may include a series of primary ribs 154 and secondary ribs 156 distributed along the outer circumference of the roller body. Primary ribs 154 may extend radially outward from the core to a greater height than secondary ribs 156. This alternating rib geometry may allow the roller body to deform locally under contact pressure, improving the ability of chainmail 126 to engage with irregular cleaning surfaces.

Primary ribs 154 may be configured to extend between adjacent grill grate bars during use. As roller body 110 rotates, chainmail 126 may be pressed into contact with both the top and side surfaces of the grill grates by the outward projection of primary ribs 154. Secondary ribs 156, being shorter in height, may provide additional radial support while preserving flexibility in the core. This combination may allow roller body 110 to compress and conform to the topography of both flat and contoured surfaces.

The spacing, height, and material hardness of primary ribs 154 and secondary ribs 156 may be selected to balance structural integrity, flexibility, and abrasive engagement. In some embodiments, the rib pattern may be symmetrical or staggered to reduce vibration or ensure uniform loading across the cleaning surface. Materials used in the core may include thermoplastic elastomers, silicones, or other flexible polymers suitable for high-temperature and chemical exposure environments.

Figure 11:
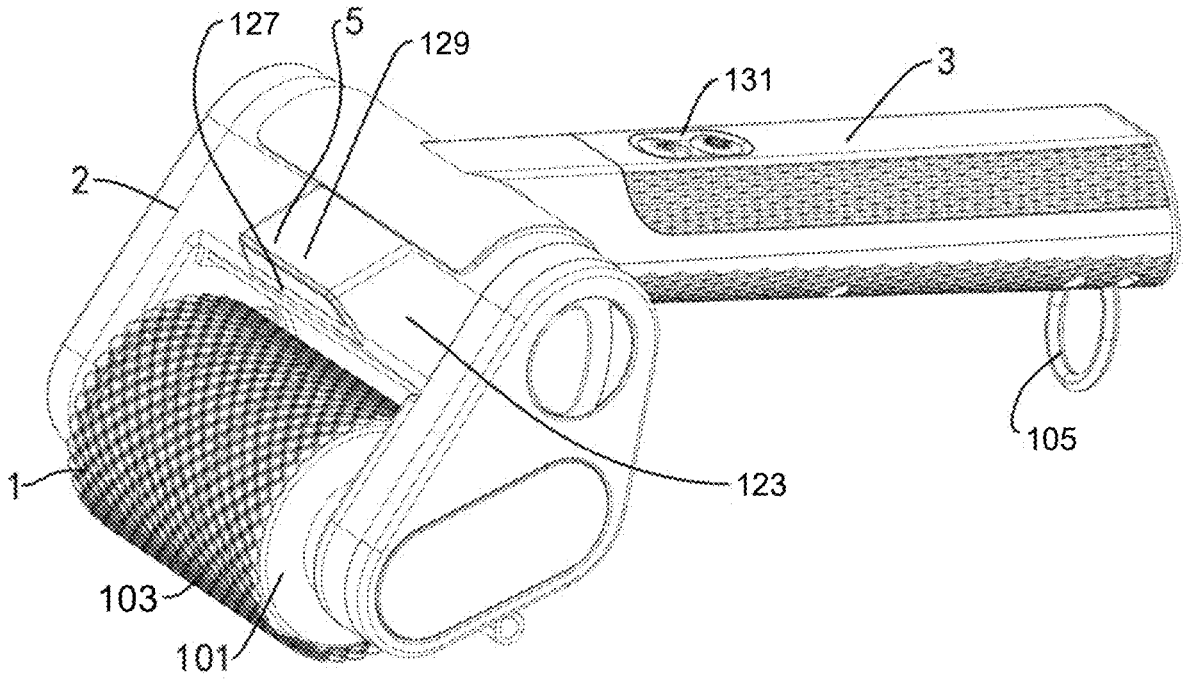
FIG. 11 is a schematic diagram of a roller-type cleaning brush, according to an embodiment of the present disclosure.

As shown in FIG. 11, a roller-type cleaning brush includes a roller-type brush body 1, a brush head 2, and a brush handle 3. The rear portion of the brush handle 3 is provided with a hanging ring 105.

Figure 12:
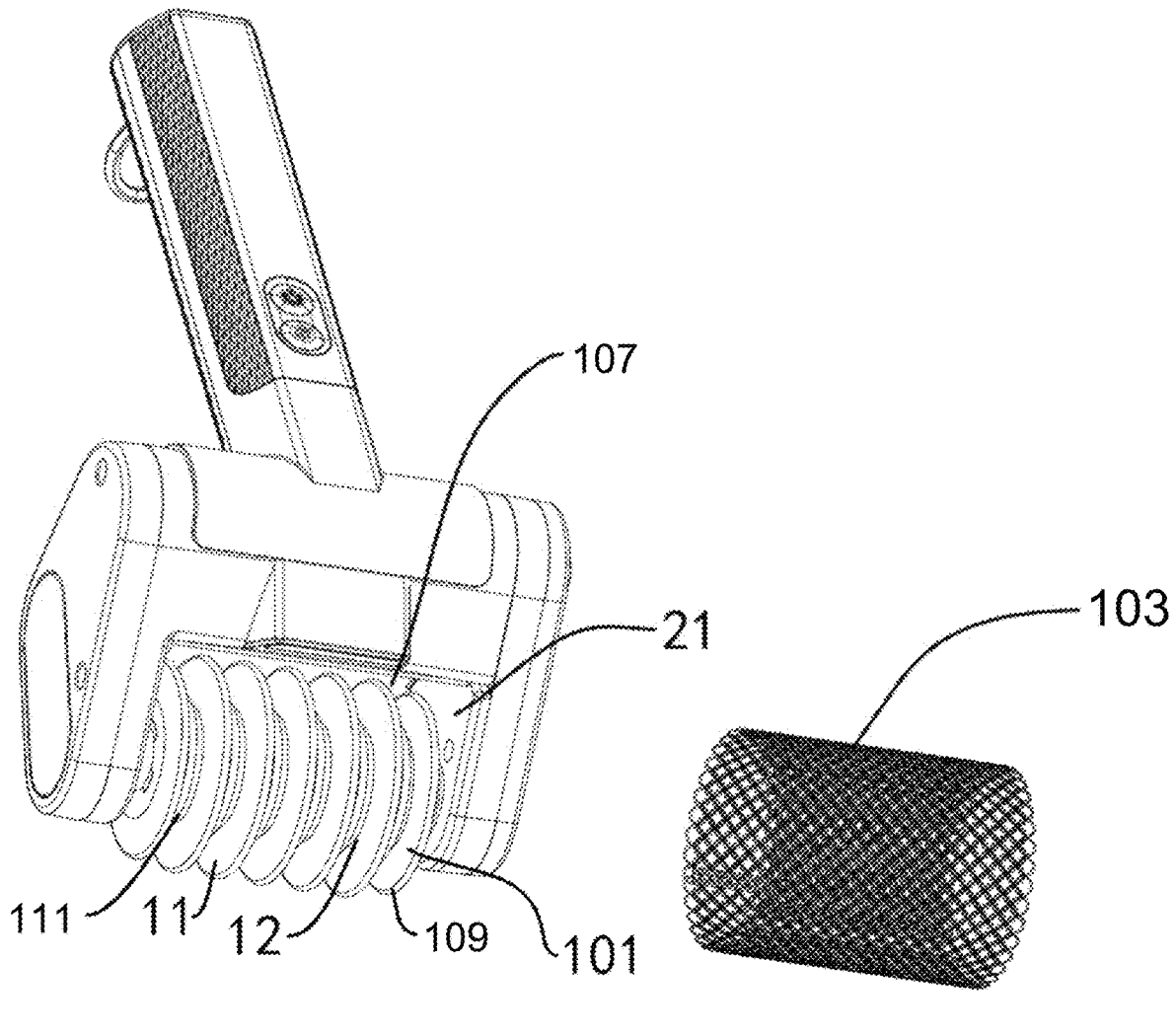
FIG. 12 is an exploded view of a roller-type cleaning brush, according to an embodiment of the present disclosure.
Figure 13:
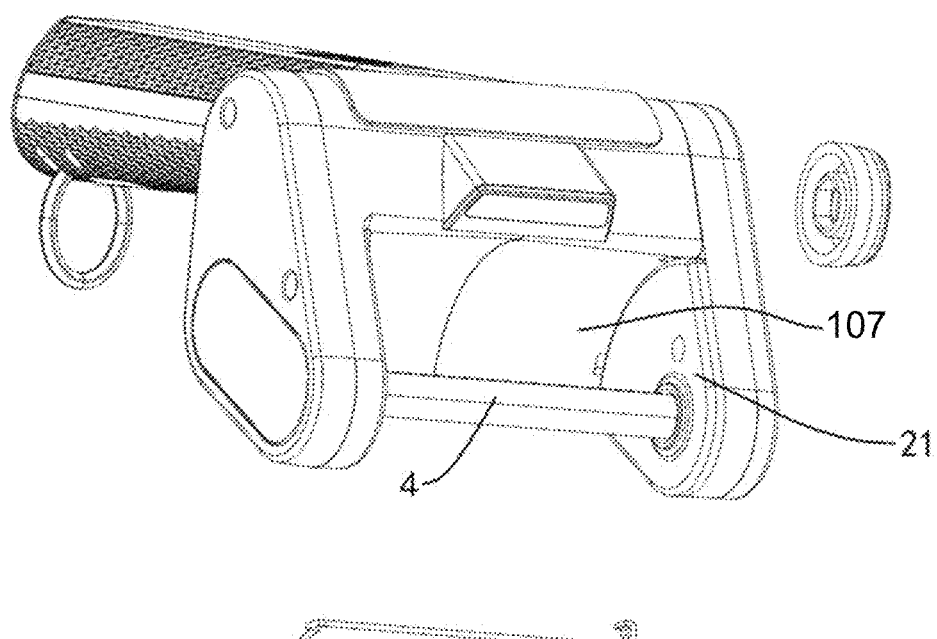
FIG. 13 is an exploded diagram of a roller-type cleaning brush, according to an embodiment of the present disclosure.
Figure 13:
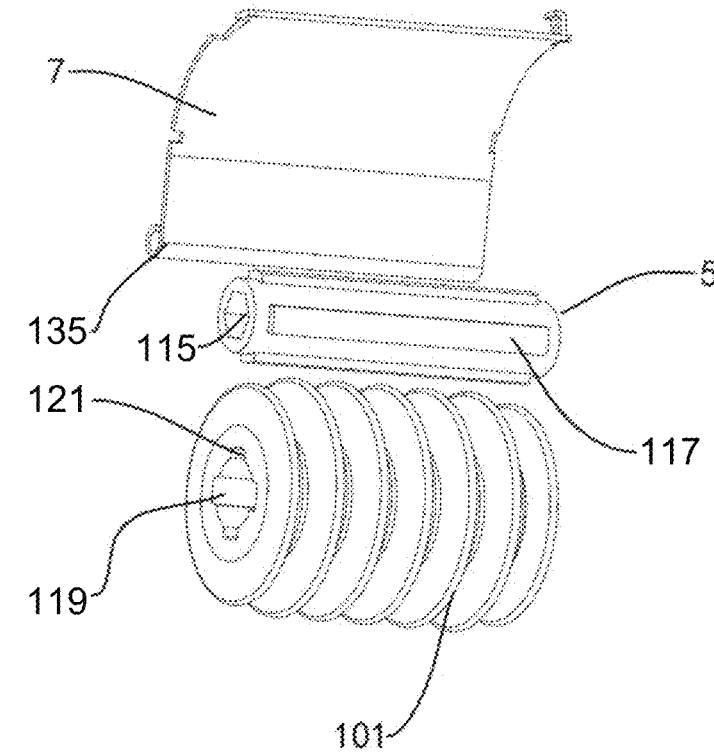

As shown in FIGS. 11-13, the brush head 2 is positioned at the front end of the brush handle 3, and a mounting slot 107 is formed at the front portion of the brush head 2. The roller-type brush body 1 is rotatably mounted within the mounting slot 107, and the axis of rotation of the roller-type brush body 1 is perpendicular to the longitudinal direction of the brush handle 3. The lower surface of the roller-type brush body 1 extends below the bottom surface of the brush head 2 to make contact with the surface to be cleaned. This rotatable connection allows the brush body to adjust dynamically to various cleaning angles and surface contours, enhancing the flexibility and thoroughness of cleaning. Additionally, the rotating configuration reduces frictional resistance during use, contributing to smoother operation.

As shown in FIGS. 11-13, the roller-type brush body 1 includes an elastic support 101 and a metal mesh sheath 103 that surrounds the periphery of the elastic support 101. The elastic support 101 offers both structural rigidity and elasticity, allowing the metal mesh sheath 103 to distribute evenly and conform closely to the surface being cleaned. This configuration improves both the durability and cleaning effectiveness of the brush body, while also increasing its adaptability to surfaces of varying hardness and texture.

As shown in FIG. 12, the elastic support 101 includes multiple protruding areas 111 and protruding areas 12 arranged in a spaced configuration. The protruding areas 111 serve as structural support for the metal mesh sheath 103, promoting even distribution of the cleaning surface and ensuring uniform cleaning force. The protruding areas 12 facilitate the evacuation of debris by effectively collecting and channeling dirt and particles away from the cleaning region, preventing clogging and helping maintain the cleanliness and effectiveness of the brush body over time. This alternating protrusion-and-depression structure also increases the active surface area and enhances surface friction, thereby improving the cleaning performance. In a preferred embodiment, the elastic support 101 is formed from silicone, which offers good elasticity along with antibacterial and mildew-resistant properties.

As further shown in FIG. 12, in a preferred implementation, the elastic support 101 comprises annular protruding ridges 109 and annular depressions 111 spaced along the axial direction, thereby forming the protruding areas 111 and protruding areas 12. The alternating annular ridge-and-depression structure improves the elastic deformation capacity of the support body and provides additional surface friction to assist in removing embedded contaminants. It also facilitates improved drainage during cleaning. The metal mesh sheath 103 is wrapped to the ends of the elastic support 101, forming a ring structure surrounding the periphery of the support. The sheath is necked at both ends, allowing it to remain stably secured to the elastic support 101 without the need for additional fastening structures.

As also shown in FIG. 12, the width of the annular protruding ridges 109 increases from the outer surface toward the inner diameter, giving the structure a ridge-like profile. This design enhances the mechanical stability of the elastic support 101 by more effectively distributing external forces and reducing localized stress concentrations, thereby minimizing the risk of structural damage.

As shown in FIGS. 11-13, the brush head 2 may be equipped with a motor configured to drive the roller-type brush body 1 in rotation during cleaning. The motorized configuration eliminates the need for manual rotation, significantly increasing the convenience of operation. Users may simply manipulate the brush handle 3 without exerting additional effort to drive the brush body, reducing fatigue and saving time.

The motor enables high-frequency rotation of the roller-type brush body 1, which improves the removal of stains and debris from the cleaning surface. Increased contact frequency and consistent rotational motion enhance both the depth and uniformity of cleaning. This approach is effective not only for ordinary surface dirt but also for more persistent or embedded stains.

As shown in FIG. 11, the front and upper surfaces of the roller-type brush body 1 extend beyond the outer contour of the brush head 2. This structural feature enlarges the cleaning area, enabling simultaneous contact with multiple surfaces and angles during operation. As a result, cleaning efficiency is improved and cleaning time is reduced, while the close fit between the brush body and the surface contributes to improved cleaning quality.

As shown in FIGS. 12-13, the front portion of the brush head 2 comprises two laterally spaced support walls 21, and a mounting groove 107 is formed between the two support walls 21. A rotating shaft 4 is transversely disposed between the support walls 21 and is rotatable relative to the walls. The roller-type brush body 1 is sleeved onto the rotating shaft 4 and is configured to rotate synchronously with it, with circumferential rotation limited by the mounting configuration.

Preferably, the output shaft of the motor is operably connected to the rotating shaft 4 through a transmission assembly, thereby driving the shaft 111 to rotate. As shown in FIG. 13, the roller-type brush body 1 further comprises a rigid shaft sleeve 5. The rigid shaft sleeve 5 and the elastic support 101 are integrally formed into a single structural unit through a rubber encapsulation process. This integral support structure is detachably sleeved onto the rotating shaft 4.

In one embodiment, the cross-section of the rotating shaft 4 is non-circular, and the rigid shaft sleeve 5 includes a corresponding non-circular shaft opening 115 that matches the shape of the shaft, enabling synchronous rotation between the rigid shaft sleeve 5 and the shaft 111. The outer surface of the rigid shaft sleeve 5 is provided with a limiting rib 117, while the elastic support 101 is formed with an internal sleeve portion 119. The inner wall of the sleeve 119 includes a slot 121 configured to receive the limiting rib 117. The engagement of the rib 117 and slot 121 enables the elastic support 101 to rotate synchronously with the rigid shaft sleeve 5.

The incorporation of the rigid shaft sleeve 5 not only ensures synchronized rotation with the rotating shaft 4 but also prevents direct mechanical connection between the rotating shaft and the flexible elastic support 101. Because the elastic support 101 is typically made of a soft and wear-sensitive material, direct coupling could lead to premature degradation. The rigid shaft sleeve 5, being a more durable component, withstands higher mechanical stress and wear, thereby enhancing the overall durability and reliability of the cleaning brush structure.

As shown in FIGS. 11-12, the front surface of the brush head 2 forms an inclined plane 123 that slopes forward from top to bottom. A lighting unit 5 is disposed on the inclined plane 123 above the mounting groove 107. The lighting unit 5 allows users to illuminate the cleaning area without requiring an external light source or manual adjustment of the lighting angle. This improves user convenience and operational efficiency.

Further, the illumination surface 127 of the lighting unit 5 is positioned on a raised protrusion 129. The illumination surface 127 is oriented perpendicular to the front surface of the brush head 2 and is configured to irradiate both the roller-type brush body 1 and the target surface to be cleaned. This arrangement allows the user to clearly observe the condition of the cleaning area, including dust or stains, enabling more accurate control of cleaning movement and pressure, and reducing the likelihood of missed or repeated cleaning.

The illumination surface 127 also enhances visibility at the point of contact between the cleaning brush and the surface being cleaned, allowing the user to adjust the brush position in real time and maintain optimal cleaning performance. Preferably, the top surface of the brush handle 3 is provided with a button 131 for controlling both the motor and the lighting unit.

As shown in FIG. 13, a deflector 7 is disposed within the mounting groove 107. The deflector 7 extends rearward from the rear side of the roller-type brush body 1 and curves downward beneath it. The deflector 7 is configured to guide the flow of wastewater generated during brush body rotation along its surface in a downward direction, thereby preventing the accumulation of wastewater around the brush body. This improves the overall cleaning efficiency, particularly in scenarios involving the removal of liquid stains or fine particulate matter, where the guided drainage helps reduce cleaning blind spots.

Preferably, the surface of the deflector 7 that faces the roller-type brush body 1 is curved to match the arc of the brush body's contour. This curvature allows the deflector 7 to more closely conform to the surface of the brush body, reducing fluid resistance and enhancing the redirection of wastewater. Additionally, the matched curvature helps maintain the brush body's stability and balance during use, minimizing the risk of deformation or uneven wear caused by imbalanced forces.

In one embodiment, the deflector 7 is detachably clipped onto the brush head 2. This configuration allows the user to remove the deflector 7 easily for cleaning or replacement. The ability to detach the deflector promotes hygiene, extends the service life of the component, and facilitates maintenance of the brush head 2, thereby improving the performance of the entire cleaning assembly.

As further shown in FIG. 13, the front end of the deflector 7 is curled downward to form a curled edge structure 135. This curled configuration enhances the structural strength and rigidity of the deflector 7, preventing deformation or damage due to excessive force during operation. It also offers a degree of protection to the roller-type brush body 1 by minimizing wear or impact from collisions or friction. Additionally, the curled edge helps direct wastewater toward the front end of the deflector 7, reducing the risk of backflow into the cleaning area.

The foregoing description relates to a roller-type cleaning brush and roller-type brush body as disclosed by the present disclosure. The technical principles and embodiments described herein are provided to facilitate understanding of the underlying concepts. It should be understood that a person of ordinary skill in the art may make various modifications and adaptations without departing from the scope and spirit of the present disclosure, and such modifications fall within the scope of the appended claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the present disclosure and its advantages have been described in detail, it should be understood that various changes, substitutions and alterations can be made herein without departing from the technology of the disclosure as defined by the appended claims. For example, relational terms, such as "above" and "below" and/or "inside" and "outside" are used with respect to a specific device. Of course, if the device is inverted, above becomes below, and vice versa. Additionally, if oriented sideways, above and below may refer to sides of a device. Further, reference to "first" or "second" instances of a feature, element, or device does not indicate that one device comes before or after the other listed device. Reference to first and/or second devices merely serves to distinguish one device that may be similar or similarly referenced with respect to another device.

Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person skilled in the art to make or use the disclosure. Various modifications to the disclosure will be readily apparent to those reasonably skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein. Accordingly, the disclosure is not to be limited by the examples presented herein, but is envisioned as encompassing the scope described in the appended claims and the full range of equivalents of the appended claims.

What is claimed is:

1. A cleaning device comprising:
a body;
a motor housed within the body;
a roller body operatively connected to the motor and configured to rotate during operation,
wherein the roller body comprises:
a flexible core extending along a central axis;
a plurality of circumferentially spaced primary ribs projecting radially outward from the flexible core to a first radial height;
a plurality of circumferentially spaced secondary ribs interleaved with the primary ribs and projecting radially outward from the flexible core to a second radial height less than the first radial height; and
a chainmail scrubbing layer disposed over the flexible core.

2. The cleaning device of claim 1, wherein the primary ribs and secondary ribs are integrally formed with the flexible core.

3. The cleaning device of claim 1, wherein the flexible core comprises a thermoplastic elastomer or silicone rubber.

4. The cleaning device of claim 1, wherein the chainmail scrubbing layer comprises interlinked stainless steel rings.

5. The cleaning device of claim 1, wherein the primary ribs and secondary ribs alternate around the circumference of the flexible core.

6. The cleaning device of claim 1, wherein the flexible core comprises a repeating pattern of alternating primary ribs and secondary ribs along an axial length of the roller body.

7. The cleaning device of claim 1, wherein the roller body is removably mounted within the body.

8. The cleaning device of claim 7, further comprising an access panel configured to open to allow removal of the roller body from the body.

9. The cleaning device of claim 8, wherein the access panel is pivotably attached to the body by a hinge.

10. The cleaning device of claim 8, wherein the access panel comprises a locking channel configured to engage with a locking interface on the body.

11. The cleaning device of claim 1, wherein the roller body comprises an axle having a conical tip configured to align the roller body with a corresponding axle mount during installation.

12. The cleaning device of claim 1, further comprising a handle connected to the body, the handle comprising a rechargeable battery configured to power the motor.

13. The cleaning device of claim 12, further comprising a charging port on the handle covered by a charging cover.

14. The cleaning device of claim 1, further comprising a light mounted on the body and configured to emit light in a direction adjacent to the roller body.

15. The cleaning device of claim 14, further comprising a light control button configured to activate or deactivate the light.

16. The cleaning device of claim 1, further comprising a debris shield positioned rearward of the roller body and configured to deflect material expelled during cleaning.

17. The cleaning device of claim 1, wherein the chainmail scrubbing layer conforms to a contour defined by a radial difference between the primary ribs and the secondary ribs.

18. The cleaning device of claim 1, wherein the motor comprises a brushless DC motor.

19. The cleaning device of claim 1, wherein the roller body is configured to clean both planar and contoured surfaces.

20. The cleaning device of claim 1, wherein the body comprises a coupling section configured to join the body to the handle and to route electrical power between the rechargeable battery and the motor.

\* \* \* \* \*